(12) United States Patent
Randall

(10) Patent No.: US 12,409,697 B2
(45) Date of Patent: Sep. 9, 2025

(54) SELF-PUMPING SPRING PRELOAD SYSTEM

(71) Applicant: Fox Factory, Inc., Duluth, GA (US)

(72) Inventor: Connor Randall, Salida, CO (US)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 18/144,792

(22) Filed: May 8, 2023

(65) Prior Publication Data

US 2024/0116324 A1 Apr. 11, 2024

Related U.S. Application Data

(60) Provisional application No. 63/339,342, filed on May 6, 2022.

(51) Int. Cl.
*B60G 17/027* (2006.01)
*B60G 15/06* (2006.01)
*B60G 17/02* (2006.01)

(52) U.S. Cl.
CPC ....... *B60G 17/0272* (2013.01); *B60G 15/066* (2013.01); *B60G 17/021* (2013.01); *B60G 2202/24* (2013.01); *B60G 2202/312* (2013.01); *B60G 2500/114* (2013.01); *B60G 2500/20* (2013.01)

(58) Field of Classification Search
CPC .............. B60G 17/0272; B60G 15/066; B60G 17/021; B60G 2202/24; B60G 2202/312; B60G 2500/114
See application file for complete search history.

(56) References Cited

U.S. PATENT DOCUMENTS

| | | | |
|---|---|---|---|
| 4,921,080 A * | 5/1990 | Lin | B60G 17/0424 188/266.5 |
| 5,022,501 A * | 6/1991 | Hayashi | B60G 17/0272 188/300 |
| 5,401,053 A * | 3/1995 | Sahm | B60G 17/016 267/221 |
| 5,556,082 A | 9/1996 | Takasaki | |
| 6,296,092 B1 | 10/2001 | Marking et al. | |
| 6,318,525 B1 * | 11/2001 | Vignocchi | F16F 9/096 188/266.6 |
| 7,374,028 B2 | 5/2008 | Fox | |
| 8,627,932 B2 | 1/2014 | Marking | |

(Continued)

FOREIGN PATENT DOCUMENTS

| | | | | |
|---|---|---|---|---|
| DE | 102018210447 B3 * | 6/2019 | ........... | B60G 17/027 |
| EP | 4147889 A1 | 3/2023 | | |
| JP | 3108078 B2 | 11/2000 | | |

OTHER PUBLICATIONS

European Extended Search Report for European Application No. 23172168.9, 10 Pages, Mailed Oct. 5, 2023.

*Primary Examiner* — Frank B Vanaman

(57) ABSTRACT

A spring preload system comprising a cylinder with an outer diameter, a body to house at least the cylinder, a piston shaft, and a main damping piston. The main damping piston is coupled to the piston shaft and configured for operation within the cylinder. The main damping piston is further configured to divide the cylinder into a compression side and a rebound side. The spring preload system further comprises a preload cylinder and a valve that is fluidly disposed between the compression side and the preload cylinder.

20 Claims, 11 Drawing Sheets

(56) References Cited

U.S. PATENT DOCUMENTS

| | | |
|---|---|---|
| 8,838,335 B2 | 9/2014 | Galasso et al. |
| 8,857,580 B2 | 10/2014 | Marking |
| 9,033,122 B2 | 5/2015 | Ericksen et al. |
| 9,120,362 B2 | 9/2015 | Marking |
| 9,239,090 B2 | 1/2016 | Marking et al. |
| 9,353,818 B2 | 5/2016 | Marking |
| 9,623,716 B2 | 4/2017 | Cox |
| 10,036,443 B2 | 7/2018 | Galasso et al. |
| 10,576,803 B2 | 3/2020 | Marking et al. |
| 11,718,137 B2 | 8/2023 | D'Orazio et al. |
| 11,840,120 B2 | 12/2023 | Randall |
| 12,227,048 B2 | 2/2025 | D'Orazio et al. |
| 2002/0171187 A1* | 11/2002 | Becker ............... B60G 17/0272 267/218 |
| 2014/0077466 A1* | 3/2014 | Murakami ........... B60G 17/021 280/6.157 |
| 2017/0057591 A1* | 3/2017 | Bender ................ B62K 25/283 |

* cited by examiner

SELF-PUMPING SPRING PRELOAD SYSTEM

CROSS-REFERENCE TO RELATED APPLICATIONS

This application claims the benefit of and claims priority of U.S. provisional patent application Ser. No. 63/339,342, filed on May 6, 2022, entitled "ELECTRONIC SELF-PUMPING SPRING PRELOAD SYSTEM" by Connor Randall, assigned to the assignee of the present application, which is herein incorporated by reference in its entirety.

BACKGROUND ART

Vehicle suspension systems typically include one or more shock assemblies. In general, a shock assembly includes a spring component or components and a damping component or components that work in conjunction to provide for a comfortable ride, enhance performance of a vehicle, and the like.

BRIEF DESCRIPTION OF THE DRAWINGS

The accompanying drawings, which are incorporated in and form a part of this specification, illustrate embodiments of the present technology and, together with the description, serve to explain the principles of the present technology.

DETAILED DESCRIPTION OF THE EMBODIMENTS

Figure 1:
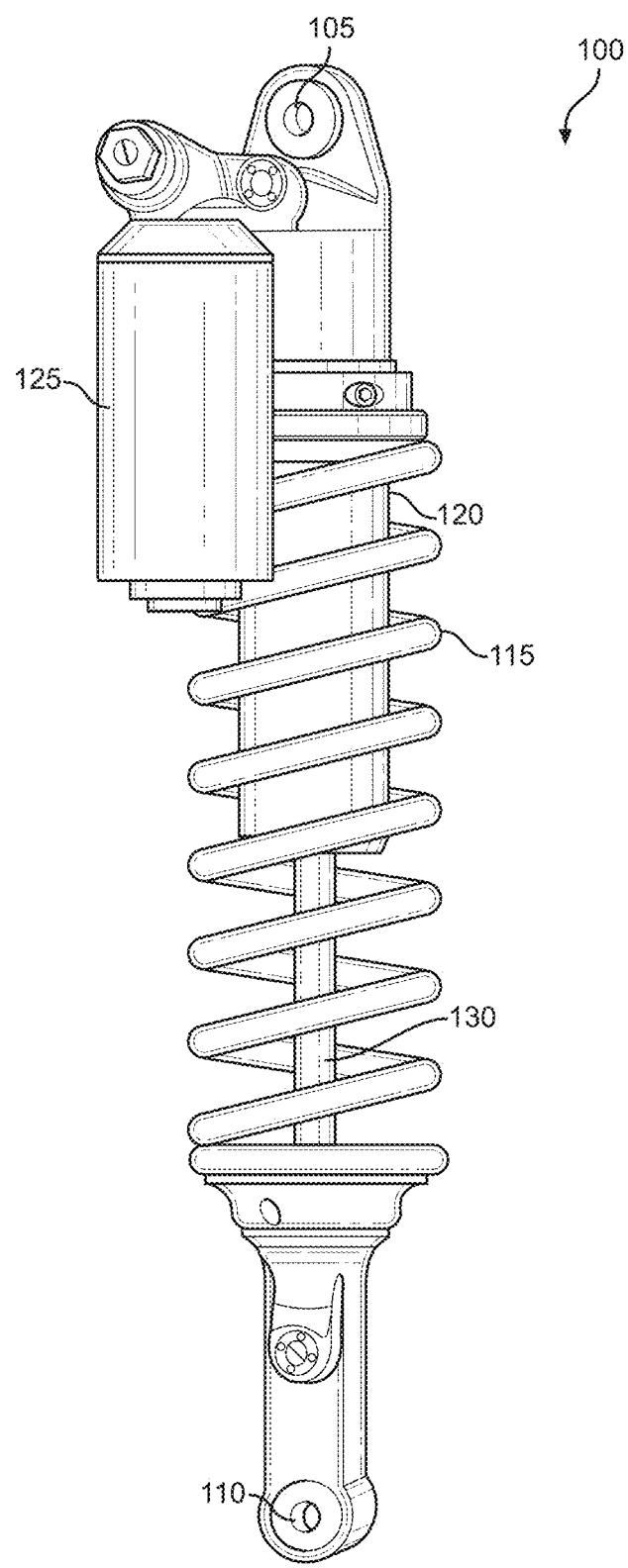
FIG. 1 is a perspective view of a shock assembly, in accordance with an embodiment.

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

In general, a suspension system for a vehicle provides a motion modifiable connection between a portion of the vehicle that is in contact with a surface (e.g., an unsprung portion) and some or all of the rest of the vehicle that is not in contact with the surface (e.g., a suspended portion). For example, the unsprung portion of the vehicle that is in contact with the surface can include one or more wheel(s), skis, tracks, hulls, etc., while some or all of the rest of the vehicle that is not in contact with the surface include suspended portions such as a frame, a seat, handlebars, engines, cranks, etc.

The suspension system will include one or numerous components which are used to couple the unsprung portion of the vehicle (e.g., wheels, skids, wings, belt, etc.) with the suspended portion of the vehicle (e.g., seat, cockpit, passenger area, cargo area, etc.). Often, the suspension system will include one or more shock assemblies which are used to reduce feedback from the unsprung portion of the vehicle before that feedback is transferred to the suspended portion of the vehicle, as the vehicle traverses an environment. However, the language used by those of ordinary skill in the art to identify a shock assembly used by the suspension system can differ while referring to the same (or similar) types of components. For example, some of those of ordinary skill in the art will refer to the shock assembly as a shock absorber, while others of ordinary skill in the art will refer to the shock assembly as a damper (or damper assembly).

In its basic form, the suspension is used to increase ride comfort, performance, endurance, component longevity and the like. In general, the force of jarring events, rattles, vibrations, jostles, and the like which are encountered by the portion of the vehicle that is in contact with the surface are reduced or even removed as it transitions through the suspension before reaching suspended portions of the vehicle to include components such as seats, steering wheels/handlebars, pedals/foot pegs, fasteners, drive trains, engines, and the like.

For example, on a wheeled vehicle, a portion of the wheel (or tire) will be in contact with the surface being traversed (e.g., pavement, dirt, gravel, sand, mud, rocks, etc.) while a shock assembly and/or other suspension system components will be coupled between a wheel retaining assembly and the suspended portion of the vehicle (often a portion of the vehicle frame and associated systems, the seat, handlebars, pedals, controls, steering wheel, interior, etc.).

In a snow machine, a portion of the track and/or the skis that will be in contact with the surface being traversed (e.g., snow, ice, etc.) while a shock assembly and/or other suspension components will be coupled between a track retaining assembly (and similarly the skis retaining assembly) and the suspended portion of the vehicle (usually including the engine and associated systems, the seat, handlebars, etc.).

In a boat or PWC vehicle, a portion of the hull will be in contact with the surface of the water while a shock assembly and/or other suspension components will be coupled between the hull and the suspended portion(s) of the vehicle (such as the seat, the handlebars, a portion of the vehicle frame, and/or the like).

In an airplane in flight, it is the airframe that is in contact with the surface being traversed (e.g., the air) while a shock assembly and/or other suspension components will be coupled between the airframe and the suspended portion(s) of the vehicle (such as the seats and the like).

As vehicle utilization scenarios change, one or more shock assemblies of the suspension system can be adjusted for different characteristics based on the use type of the vehicle, terrain, purpose (e.g., rock crawl, normal use, race set-up, etc.), and the like. For example, a downhill mountain bike rider (motocross rider, off-road truck driver, side-by-side rider, snow machine racer, etc.) would want a suspension configuration with a large range of motion and aggressive rebound and compression speeds to maintain as much contact as possible between the tires and the ground by absorbing the terrain events such as bumps, ruts, roots, rocks, dips, etc. while reducing the impacts felt at the suspended portion and also have the suspension return to its SAG setting as quickly as possible in preparation for the next encounter.

In contrast, a street bike racer (track racing vehicle, boat/PWC racer, etc.) would want a firmer suspension configuration with a very small range of motion to provide feel for the grip of the tire, maintain friction and/or aerodynamic geometries, and the like, in order to obtain the maximum performance from the vehicle.

In a normal use scenario, such as a trip to the local store, a ride around town or on a path, a drive to grandma's house, a boat ride out on a lake, etc., one choice for the suspension configuration would be based on providing the most comfort.

In one embodiment, there may be times where changes to a suspension component are desired during a given ride/drive. For example, a bike rider in a sprinting scenario would often want to firm up or possibly even lockout the suspension component to remove the opportunity for rider induced pedal bob. Similarly, a ride/drive from a paved road to an off-road environment (or vice-versa) would also be a time when a change to one or more suspension component settings is valuable.

With respect to the term lockout, for purposes of the following discussion, lockout refers to the most restricted flow state attainable or desirable. Thus, in one embodiment, lockout refers to a stoppage of all fluid flow through a given fluid path. However, in another embodiment, lockout does not stop all the fluid flow through a given fluid path. For example, a manufactured component may not be able to stop all fluid flow due to tolerances, or a manufacturer (designer, etc.) may not want to stop all fluid flow for reasons such as lubrication, cooling, etc. Similarly, a lockout state could be a "perceived lockout"; that is, the flow area through a flow path of the shock assembly has been reduced to a minimum size for a given shock assembly, machine, environment, speed, performance requirement, etc. For example, in one "perceived lockout" most, but not all, of the fluid flow is minimized while in another "perceived lockout" the fluid flow is reduced by only half (or a third, quarter, three-quarters, or the like).

In the following discussion, the term ride height refers to a distance between a portion of a vehicle and the surface across which the vehicle is traversing. Often, ride height is based on one or more of a number of different measurements such as, but not limited to, a distance between a part of the vehicle and the ground, a measurement between the top of an unsprung portion of a vehicle and a suspended portion of the vehicle there above, etc. For example, a portion of the wheel(s) (or ski, track, hull, etc.) will be in contact with the surface, while one or more shock assemblies and/or suspension components maintain the suspended portion of the vehicle a certain height there above.

In one embodiment using a wheeled vehicle example, a portion of the wheel will be in contact with the surface while a shock assembly and/or other suspension components will be coupled between a wheel retaining assembly and the suspended portion of the vehicle (often a portion of the vehicle frame). The ride height is established by the geometries of the shock assembly and/or other suspension components, the wheel retaining assembly, the wheel and tire profile, and the like.

Similarly, in a snow machine, a portion of the track (and similarly the skis) will be in contact with the surface while a shock assembly and/or other suspension components will be coupled between a track retaining assembly (and similarly the skis retaining assembly) and the suspended portion of the vehicle (often a portion of the vehicle frame). Here again, the ride height is established by the geometries of the shock assembly and/or other suspension components, the track and ski retaining assemblies, the track and/or ski profile, and the like.

In one embodiment, such as a boat or PWC vehicle, a portion of the hull will be in contact with the surface of the water while a shock assembly and/or other suspension components will be coupled between the hull and the suspended portion(s) of the vehicle (such as the seat, the handlebars, a portion of the vehicle frame, and/or the like). Here again, the ride height is established by the geometries of the shock assembly and/or other suspension components, with respect to the hull and the suspended portion(s) of the vehicle.

The term initial SAG settings or "SAG" refers to a pre-defined vehicle ride height and suspension geometry based on the initial compression of one or more shock assemblies of the suspension system for a given vehicle when it is within its normal load envelope configuration (e.g., with a rider/driver and any initial load weight). Once the SAG is established for a vehicle, it will be the designated ride height of the vehicle, until and unless the SAG is changed.

The initial SAG for a vehicle is usually established by the manufacturer. The vehicle SAG can then be modified and/or adjusted by an owner, a mechanic, or the like. For example, an owner can modify the SAG to designate a new normal ride height based on a vehicle use purpose, load requirements that are different than the factory load configuration, an adjustment modification and/or replacement of one or more of the suspension components, a change in tire size, a performance adjustment, aesthetics, and the like.

In one embodiment, the initial manufacturer will use SAG settings resulting in a pre-established vehicle ride height based on vehicle use, size, passenger capacity, load capacity, and the like. For example, a truck (side-by-side, car, or the like) may have a pre-established SAG based on an expected load (e.g., a number of passengers, an expected cargo requirement, etc.).

Regardless of the vehicle type, once the SAG is established, in a static situation the ride height of the expectedly loaded vehicle should be at or about the established SAG. When in motion, the ride height will change as the vehicle travels over the surface, and while the suspension system is used to reduce the transference of any input forces received from the surface to the rest of the vehicle it is also used to maintain the vehicle's SAG.

However, when additional weight is added to the vehicle, the suspension and one or more shock assemblies will be compressed, and the vehicle ride height will be less than the SAG.

For example, if a vehicle such as a snow machine, PWC, boat, motorcycle, or bicycle is loaded with an additional 100 lbs. of cargo in the rear, the extra 100-pound load will cause shock assembly compression (and the like) thereby causing the vehicle to ride lower in the rear (or to ride in a bow up orientation). In general, skewed rear-low ride height will move the vehicle out of SAG and change the vehicle geometry, e.g., cause a slant upward from rear to front. Often, an out of SAG condition is visually identifiable and in this particular example can result in lightness in steering, rear suspension bottom out, forward visual obstruction, and the like.

In one embodiment, for example in a side-by side that is loaded with 250 lbs. of additional weight, the additional weight will reduce the available operating length of one or more suspension components which can be detrimental to steering and performance characteristics, could cause an unwanted impact between wheel (or wheel suspension) and frame, increase the roughness of the ride, increase suspension stiffness, result in suspension bottom out, loss of control, tire blow out, and the like.

In one embodiment, for example in a truck that is loaded with 500 lbs. of additional weight, when the weight is added to the vehicle, if it is not centered, it will not only cause a change in the front or rear SAG (depending upon the load location fore or aft), but will also cause SAG changes that will differ between the left and right side of the vehicle. For example, if the load is in the rear and off-center to the left, the load-modified ride-height of the vehicle will be lopsided. That is, not only will the rear of the vehicle be lower than the front, but the left-side suspension will also be compressed more than the right-side suspension causing the rear left of the vehicle to have a lower ride-height than the other three corners.

Thus, while the entire rear of the vehicle will be out of SAG and therefore riding lower than the front of the vehicle, it will also be lopsided between the left and right sides. Such lopsided suspension characteristics can be extremely deleterious while driving and will often result in a number of deleterious issues including, but not limited to: steering problems, suspension bottom out, loss of control, tire blowout, and vehicle rollover.

In contrast to the examples above, when the weight on the vehicle (e.g., rider, passengers, cargo, etc.) is less than the expectedly loaded vehicle weight, the suspension and one or more shock assemblies will be less compressed, and the vehicle ride height will be higher than the SAG. This lighter loaded situation can also result in a number of deleterious issues including, but not limited to: improper seat height (e.g., a rider will be higher off the ground than expected), change in vehicle height clearance, suspension top-out, suspension issues caused by the vehicle operating outside of the operating envelope for the suspension, and the like.

Additional information regarding SAG and SAG setup can be found in U.S. Pat. No. 8,838,335 which is incorporated by reference herein, in its entirety.

A shock assembly often include a damper body surrounded by or used in conjunction with a mechanical spring or constructed in conjunction with an air spring or both. The shock assembly often consists of a damping piston and piston rod telescopically mounted in a fluid filled cylinder (or damper housing). The damping or working fluid may be, for example, hydraulic oil. A mechanical spring may be a helically wound spring that surrounds or is mounted in parallel with the damper body. As used herein, the terms "down" "up" "downward" upward" "lower" "upper" and other directional references are relative and are used for reference only.

Overview

With reference now to FIG. 1, a perspective view of a shock assembly 100 is shown in accordance with one embodiment. In one embodiment, shock assembly 100 is a coil sprung shock assembly 100. However, it should be appreciated, in the following discussion, in another embodiment, the shock assembly 100 may be representative of different and/or other types of shock assemblies such as, but not limited to, those used as a front shock assembly, rear shock assembly, etc. In one embodiment, shock assembly 100 includes eyelets 105 and 110, damper housing 120, helical spring 115, piston shaft 130, and piggyback (or external reservoir 125). A configuration of an external reservoir, including a floating piston, is described in U.S. Pat. No. 7,374,028 the content of which is incorporated by reference herein, in its entirety. External reservoir 125 may also be referred to as remote reservoir 125.

In one embodiment, the damper housing 120 (or cylinder 120) includes a chamber with a main piston. In one embodiment, the damper housing 120 includes a base valve comprising a floating piston within the damper housing to separate the working fluid from a pressurized gas, wherein the base valve is used to compensate for a reduction in available volume of the damper housing 120 of the shock assembly 100 as the piston shaft 130 moves into the damper housing 120.

The available fluid volume within a damping chamber changes as the piston shaft moves in and out of the damping chamber. For example, the amount of damping fluid which can be held within the damping chamber is reduced when the shock assembly is completely compressed such that the piston shaft is largely within the damping chamber (thereby displacing damping fluid by the volume of the shaft). In a typical shock assembly, there is a compressible gas volume in fluid communication with the damping chamber to allow the shaft displaced fluid volume to be taken up by compression of the compressible gas volume. Deleteriously, during operation of the shock assembly in rapid compression under relatively high load, the compressible gas volume can be suddenly collapsed (if the pressure induced by the load is much higher than the gas volume pressure and such pressure can be freely communicated to the gas volume) thereby subverting the damping operation of the piston and allowing the piston to fully compress into the damping chamber at a high rate. During such a compression event, damping fluid is not properly transferred to the rebound side of the damping piston and a vacuum is created or "pulled" on the rebound side of the piston due to lack of timely fluid back fill. That vacuum "bubble" then collapses as the compression rate slows near completion of the loading event which caused the rapid compression. Such vacuum formation and collapse are known as cavitation and that can be both damaging to hardware and quite noisy. It is desirable to prevent such a cavitation event (and the corresponding malfunction of the damper under high load).

This problem may be solved using a device to meter fluid flow from the compression side of the damping piston to the compressible gas volume.

In different embodiments, a base valve is similar to a piston in that it may have holes, shims and a jet in its center. Often, the base valve is fixed in the damping chamber, usually between the piston and the IFP to create a third chamber therein. Basically, during the compression stroke, the base valve allows the displacement of a volume of working fluid equal to the shaft volume entering the damping chamber, which moves the IFP. However, the base valve also maintains the resistance necessary to force working fluid through the piston. During the rebound stroke, the gas behind the IFP presses outward and working fluid is able to move through the base valve back into the compression chamber.

As such, the base valve allows a decrease (or even elimination) of a pressure of the gas in the shock assembly. Moreover, the base valve prevents cavitation in the working fluid, but doesn't increase the force necessary to move the shaft. This allows the shock assembly to respond better at low shaft speeds, such as for example on a smoother surface, where the shaft isn't moving as quickly as it would if the vehicle were traversing a lot of bumps.

In one embodiment, instead of (or in addition to) the base valve, shock assembly 100 includes the external reservoir 125. In one embodiment, external reservoir 125 includes a floating piston and pressurized gas to compensate for a reduction in volume in the main damper chamber of the shock assembly 100 as the piston shaft 130 moves into the damper body. Fluid communication between the main damper chamber of the shock assembly and the external reservoir 125 may be via a flow channel including an adjustable needle valve. In its basic form, the shock assembly works in conjunction with the helical spring and controls the speed of movement of the piston shaft by metering incompressible fluid from one side of the damper piston to the other, and additionally from the main chamber to the reservoir, during a compression stroke (and in reverse during the rebound or extension stroke).

Although a coil sprung shock assembly 100 is shown in FIG. 1, this is provided as one embodiment and for purposes of clarity. In one embodiment, the shock assembly 100 could be a different type such as, but not limited to, an air sprung fluid damper assembly, a stand-alone fluid damper assembly, and the like.

Shock assemblies are used in numerous different vehicles and configurations to absorb some or all of a movement that is received at a first portion of a vehicle before it is transmitted to a second portion of the vehicle. For example, when a wheel hits a pothole, the encounter will cause an impact force on the wheel. However, by utilizing suspension components including one or more shock assemblies, the impact force can be significantly reduced or even absorbed completely before it is transmitted to a person on a seat of the vehicle.

Often shock assemblies consist of at least a cylinder with an inner diameter, a rod movably disposed within the cylinder, and a main damping piston coupled to the rod. The main damping piston is configured to divide the cylinder into a compression side and a rebound side. Such shock assemblies may be monotube, or two concentric cylinders. The main damping piston may be vented or solid. Internal bypasses or external bypasses may also be present.

For additional detail and description of a shock absorber/damper, see, as an example, U.S. Pat. No. 10,576,803 the content of which is incorporated by reference herein, in its entirety. For additional detail and description of position-sensitive shock absorber/damper, see, as an example, U.S. Pat. No. 6,296,092 the content of which is incorporated by reference herein, in its entirety.

For additional detail and description of adjustable compression and/or rebound damping, preload, crossover, bottom-out, and the like for a shock absorber/damper, see, as an example, U.S. Pat. No. 10,036,443 the content of which is incorporated by reference herein, in its entirety.

One method of controlling ride height is by altering the preload of the springs one a shock assembly. In order to alter the preload, it is possible to use an external pump system to change the pressure settings. However, a simpler solution such as utilizing the shock assembly pressure to adjust the preload would be advantageous. Disclosed herein is an electronic self-pumping spring preload system that has the benefit of not requiring any external pumps in order to alter the preload of a shock assembly, and change the ride height of a vehicle.

Adjusting the ride height is useful in situations where there is a change in load of the vehicle, for instance carrying passengers, fuel levels decreasing over the course of a race, hauling a load, encountering rough or rocky terrain, etc.

Figure 2:
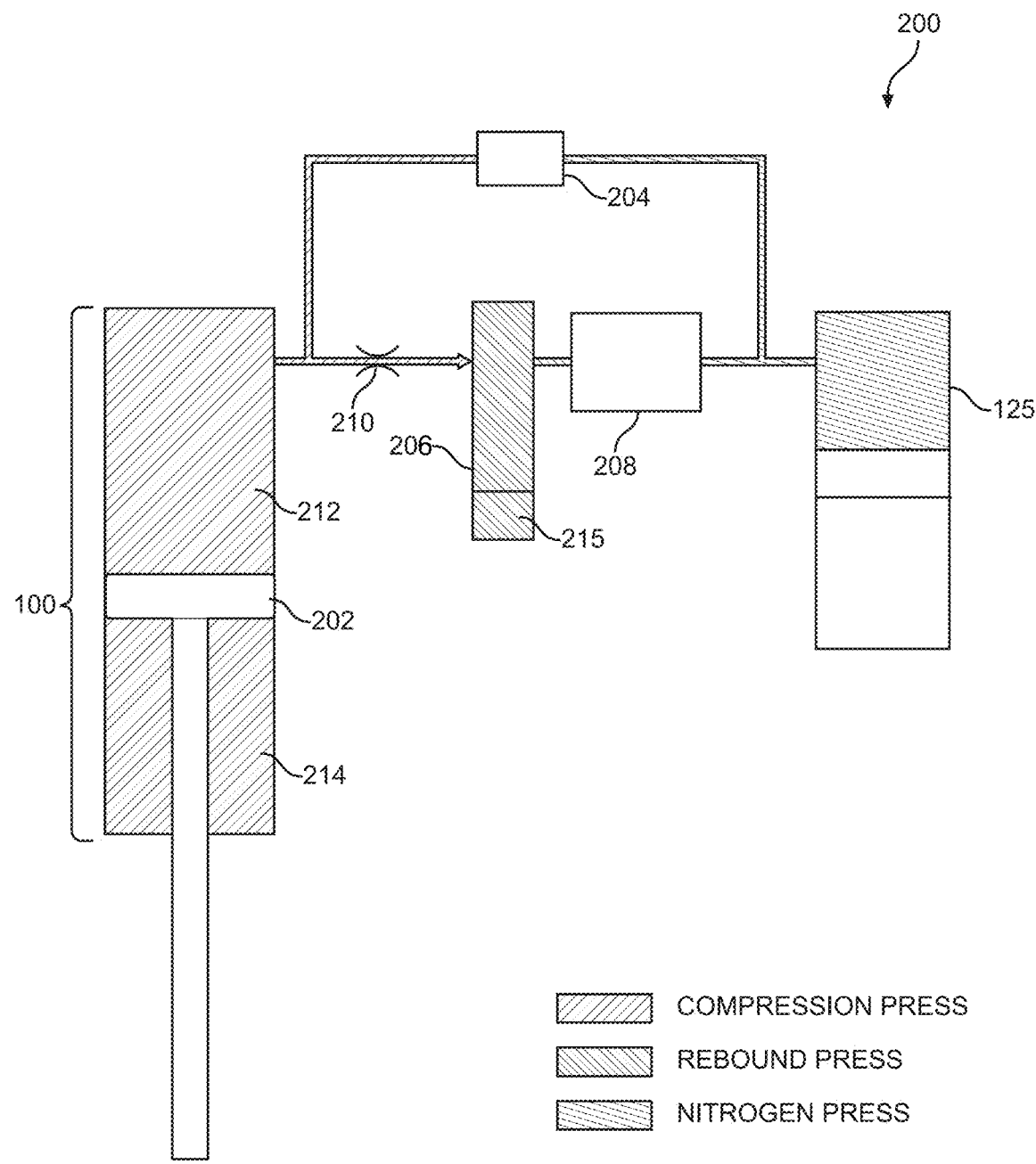
FIG. 2 is a hydraulic overview of spring preload system, in accordance with an embodiment.

FIG. 2 is a hydraulic overview of spring preload system 200, in accordance with an embodiment. It should be understood that FIG. 2 is meant to show the fluid flow paths of the system shown in at least FIG. 3. Included are main damping piston 202, base valve 204, preload cylinder 206, valve 208, orifice 210, compression chamber 212, rebound chamber 214, and spring 215.

In one embodiment, a compression stroke is used to pump fluid into a cavity in order to increase the preload affecting the system. In one embodiment, a compression stroke is used to pump fluid into a preload chamber in order to increase the preload affecting the system.

In one embodiment, spring preload system 200 uses a proportional valve to enable or disable the preload system, as well as alter the damping of the shock assembly 100. In one embodiment, spring preload system 200 uses a modal flow control valve to enable or disable the preload system, as well as alter the damping of the shock assembly 100. It should be noted that other valve types can easily be utilized for spring preload system 200, and that the listed valves are not meant to be restrictive. In one embodiment, compression damping will increase with an increase in preload, and decrease with a decrease in preload. One benefit of this embodiment is that it allows for a change in preload without requiring an external pump.

In one embodiment, main damping piston 202 divides damper housing 120 into a compression chamber 212 and a rebound chamber 214. Compression chamber 112 is in fluid communication with base valve 204 and preload cylinder 206. In one embodiment, as shock assembly 100 is compressed, fluid will flow out of the compression chamber 212, through base valve 204, and into an external reservoir 125. At the same time, fluid can flow through orifice 210 into the preload cylinder 206, and from the preload cylinder 206 through valve 208 and into the external reservoir 125. As shock assembly 100 rebounds, fluid will return to the compression chamber 212 from the external reservoir 125 through base valve 204. In one embodiment, orifice 210 includes a check valve to prevent fluid from flowing from the preload cylinder 206 to the compression chamber 212. In one embodiment, valve 208 includes a check system to prevent fluid from flowing from external reservoir 125 to the preload cylinder 206.

Valve 208 and base valve 204 can be a passive valve, a semi active valve, or an active valve. In one embodiment, valve 208 can be a pressure relief valve, an electronic valve, a solenoid operated valve, a dc motor, a stepper motor, a manual knob, etc.

In one embodiment, valve 208 is a modal valve with a pressure relief system.

In one embodiment, instead of (or in addition to) restricting the flow through the orifice, the active valve can vary a flow rate through an inlet or outlet passage within the active valve, itself. In other words, the active valve, can be used to meter the working fluid flow (e.g., control the rate of working fluid flow) with/or without adjusting the flow rate through orifice. Additional information regarding active and semi-active valves, including those used for compression and/or rebound stiffness adjustments, preload adjustments, bottom-out control, preload adjustment, ride height adjustment, and the like see, as an example, U.S. Pat. Nos. 9,353,818 and 9,623,716 the content of which are incorporated by reference herein, in their entirety.

In one embodiment, the flow passage of orifice 210 is smaller than the flow passage of valve 208. This arrangement also allows the bypass flow rate to be set when there is no preload. In one embodiment, valve 208 is used to control when there is preload, or when the preload should be released, and fluid retuned to the rest of the system. For example, if valve 208 is in a closed position, then fluid can only enter valve 208 from compression chamber 212 and pressure in the preload cylinder 206 will build up and increase the preload of the system. From a state where there is an existing preload, if valve 208 is opened then the pressure differential between preload cylinder 206 and external reservoir 125 will lead to fluid flowing to the external reservoir 125. If there is no preload and valve 208 remains open, then the spring preload system 200 will be in a "soft" setting as preload will not increase.

Figure 3:
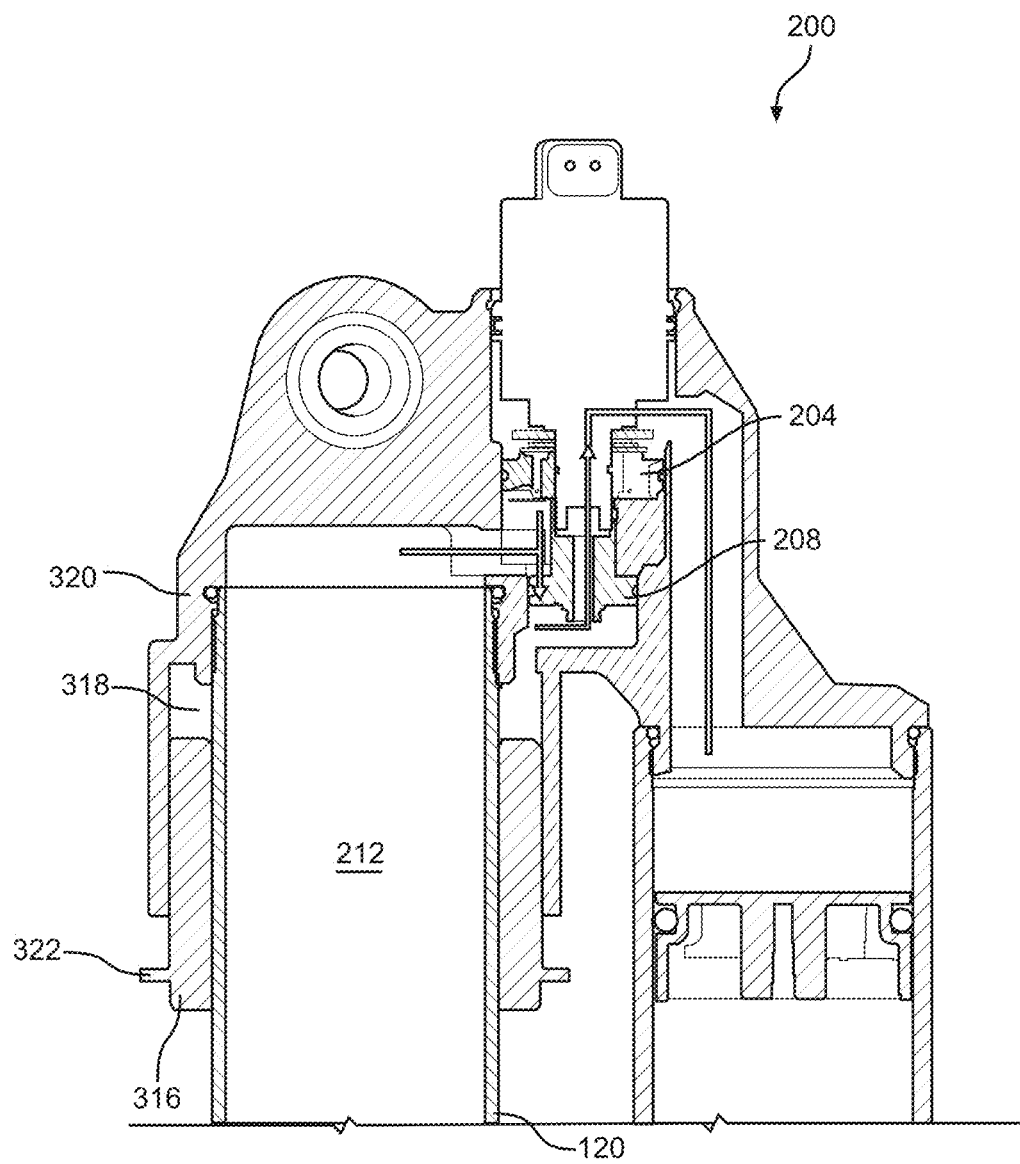
FIG. 3 is a cross sectional view of spring preload system in an intermediate extension position, in accordance with an embodiment.

FIG. 3 is a cross sectional view of spring preload system 200 in an intermediate extension position, in accordance with an embodiment. Also included are preload flange 316, preload cavity 318, body 320, and ledge 322.

In one embodiment, preload cylinder 206 is comprised of at least preload flange 316 and preload cavity 318. In one embodiment, preload flange 316 is disposed around the outer diameter of damper housing 120 and moves along damper housing 120. In one embodiment, preload cavity 318 is formed by at least damper housing 120, preload flange 316, and body 320. In one embodiment, ledge 322 is used to brace against spring 215. In one embodiment, spring 215 is the same as helical spring 115. In one embodiment, spring 215 is a preload spring 215 and is a separate spring from helical spring 115. Spring 215 enacts a force on preload flange 316 that biases preload flange 316 to minimize the volume of cavity 318.

In one embodiment, when valve 208 is in a closed position and preload is building up, fluid will flow into cavity 318. Once the fluid pressure building up in cavity 318 builds up enough to overcome the pressure from spring 215, cavity 318 will begin to expand and push against spring 215. With this, the preload is increased for shock assembly 100.

In one embodiment, there is a flow path through valve 208 that allows fluid to bypass the restrictions of base valve 204 when valve 208 is in an open position.

In one embodiment, base valve 204 has a blow off pressure that is tuned such that it corresponds with spring preload system 200 maintaining an intermediate position, such as that shown in at least FIG. 3. In such an embodiment, when valve 208 is closed the settings of base valve 204 are set to where above a certain pressure fluid will flow through the base valve 204 instead of increasing the preload. In one embodiment, base valve 204 can be adjusted to have more than one intermediate position setting (for instance, having a spring against the shim stack in base valve 204, there the preload of the spring can be adjusted).

In one embodiment, there is a sensor that can detect the travel distance of preload flange 316, and a micro controller that can control valve 208 in order to have controlled intermediate settings.

Figure 4:
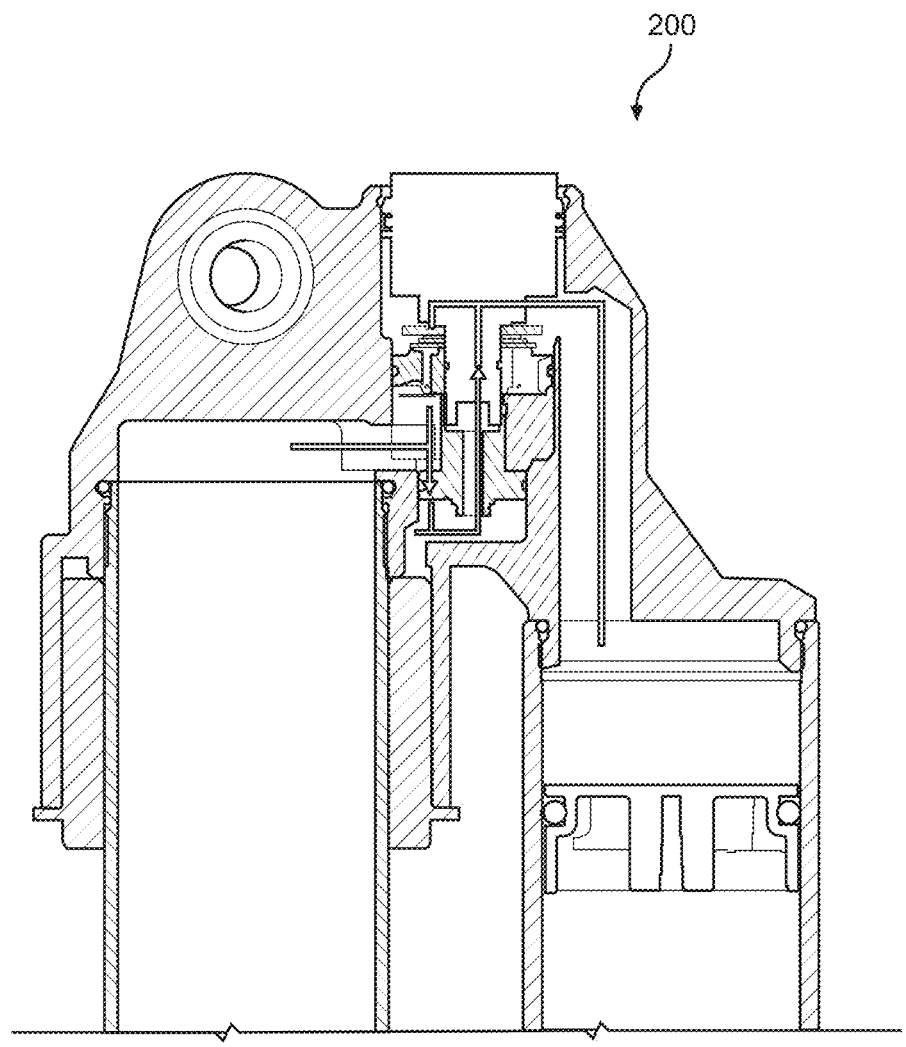
FIG. 4 is a cross sectional view of spring preload system in a minimum extension position, in accordance with an embodiment.

FIG. 4 is a cross sectional view of spring preload system 200 in a minimum extension position, in accordance with an embodiment. When spring preload system 200 is in a minimum extension position, there is no additional preload on shock assembly 100. In such a case, valve 208 is in an open position to allow fluid to flow and bypass base valve 204. One advantage of this state is the decrease in compression damping, which is useful for scenarios such as loading a vehicle with a heavy load.

In one embodiment, there is a check valve to prevent fluid from flowing into the preload cylinder 206 from the external reservoir 125. Such a check valve would have the benefit of building up the preload faster than if it were not present.

Figure 5:
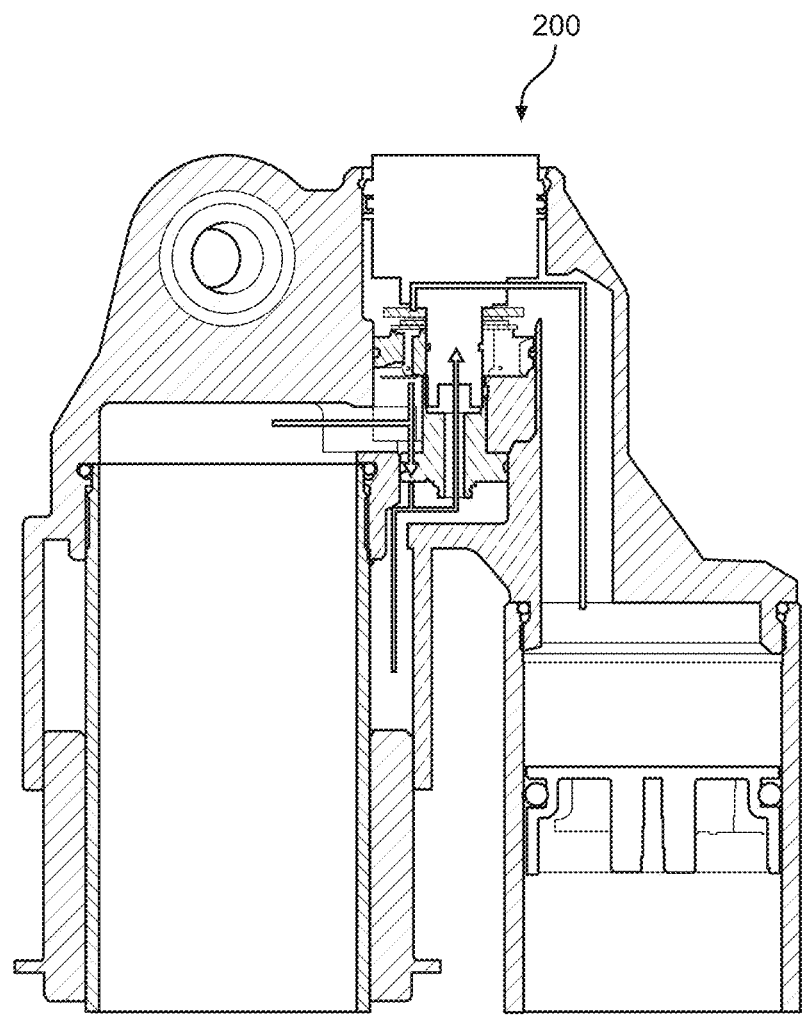
FIG. 5 is a cross sectional view of spring preload system in a maximum extension position, in accordance with an embodiment.

FIG. 5 is a cross sectional view of spring preload system 200 in a maximum extension position, in accordance with an embodiment. When spring preload system 200 is in a maximum extension position, there is a maximum amount of preload on shock assembly 100. In such a case, valve 208 is in a closed position to prevent fluid flow out of the preload cylinder 206. Similarly, the pressure in cavity 318 would prevent additional fluid from entering as the shock assembly continues to go through compression and rebound strokes. With valve 208 in a closed position, there is an increase in compression damping.

In one embodiment, valve 208 has a blow off such that spring preload system 200 will not be damaged in certain use cases (such as unusually big compression events to the shock assembly 100). In one embodiment, there is a physical stop to limit the extension of preload flange 316.

In one embodiment, body 320 is formed to be able to accommodate various types of damper housings 120. In one embodiment, a shock assembly 100 that does not include a spring preload system 200 can be modified to include one.

In one embodiment, there is a boot, wiper seal, cover, or similar structure formed around at least the damper housing 120 and preload flange 316 to prevent debris from entering the system.

Figure 6:
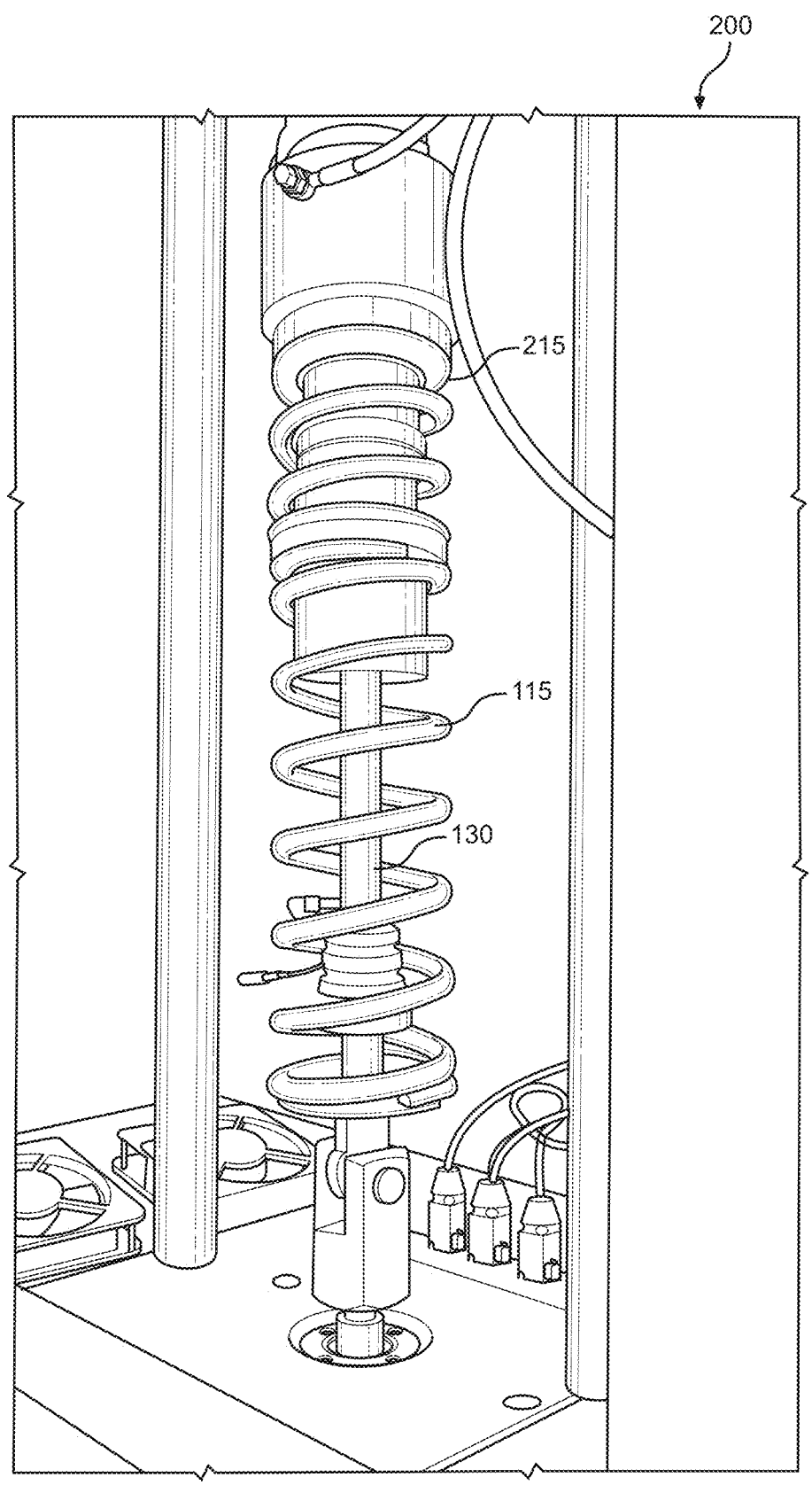
FIG. 6 is a perspective view of a shock assembly with a spring preload system, in accordance with an embodiment.

FIG. 6 is a perspective view of a shock assembly 100 with a spring preload system 200, in accordance with an embodiment. In this embodiment, helical spring 115 and spring 215 can be seen as separate springs.

In some embodiments, the spring preload system is formed in a cylinder separate from shock assembly 100 and is connected via hosing. In one embodiment, the hosing is fluidly connected to the compression chamber of the shock assembly 100 (whether mono tube, concentric tube, etc.) with the spring preload system.

Figure 7:
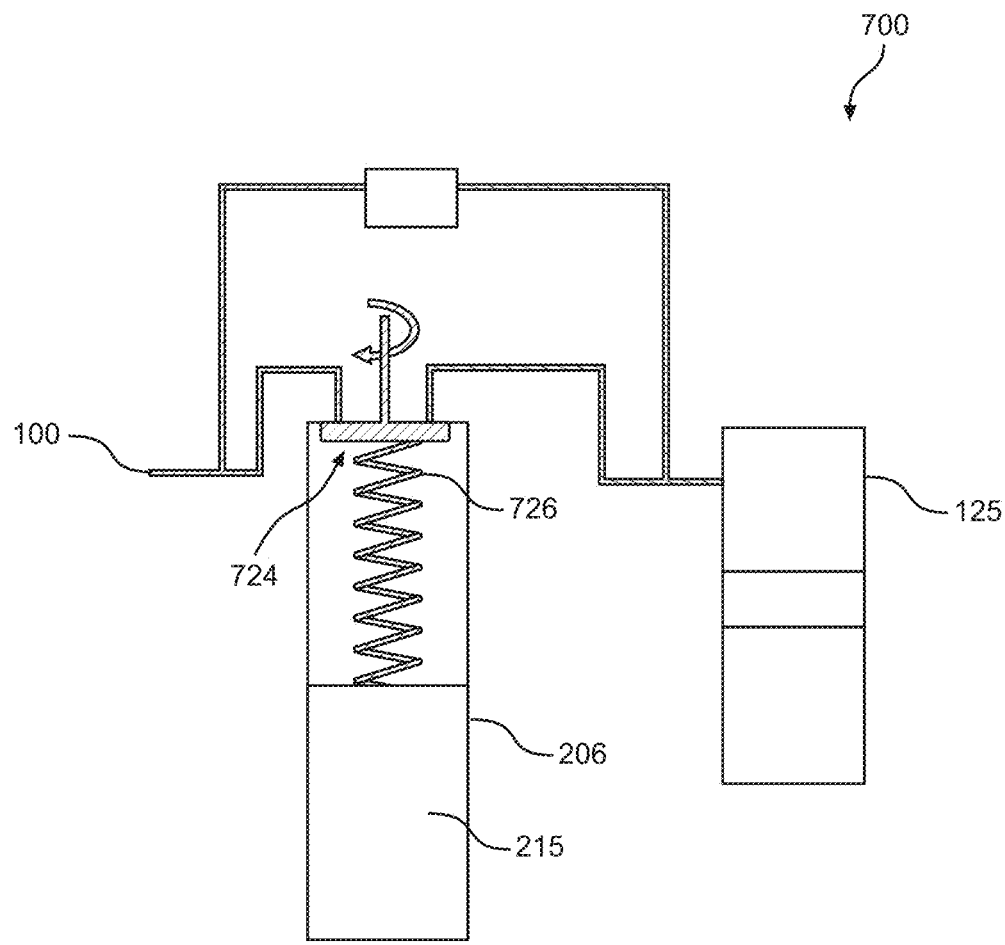
FIG. 7 is a hydraulic overview of spring preload system, in accordance with an embodiment.

FIG. 7 is a hydraulic overview of a remote spring preload system 700, in accordance with an embodiment. Also included are preload cylinder 206, check shim 724, and check spring 726.

In one embodiment, preload cylinder 206 is located in a position remote from shock assembly 100. In one embodiment, a rotary motor (e.g., DC, stepper, etc.) is used to rotate a check shim 724. In one embodiment, check shim 724 is shaped to where it can have the ports in and out of preload cylinder 206 simultaneously covered or open (e.g., rectangularly shaped, clover shaped, etc.). In one embodiment, check shim 724 is shaped to where at least one port can be covered (e.g., clover shaped, scattered openings, etc.). Check spring 726 is used to bias check shim 724 towards a closed position.

In one embodiment, spring preload system 700 has similar mechanics to spring preload system 200. For example, a compression stroke of shock assembly 100 will cause fluid to flow from shock assembly 100 to the base valve and to the preload cylinder 206. Check shim 724, when in a closed position, is used to prevent fluid from flowing out of preload cylinder 206 and into external reservoir 125. When check shim 724 is moved to an open position, there is a pressure dump as fluid flows from preload cylinder 206 and to external reservoir 125.

One advantage of the embodiment shown in at least FIG. 7 is an increase in potential preload and compression damping when it is loaded with one valve/check shim 724. Additionally, the remote location of preload cylinder 206 allows the working fluid to disperse heat and lower any viscosity changes.

Figure 8:
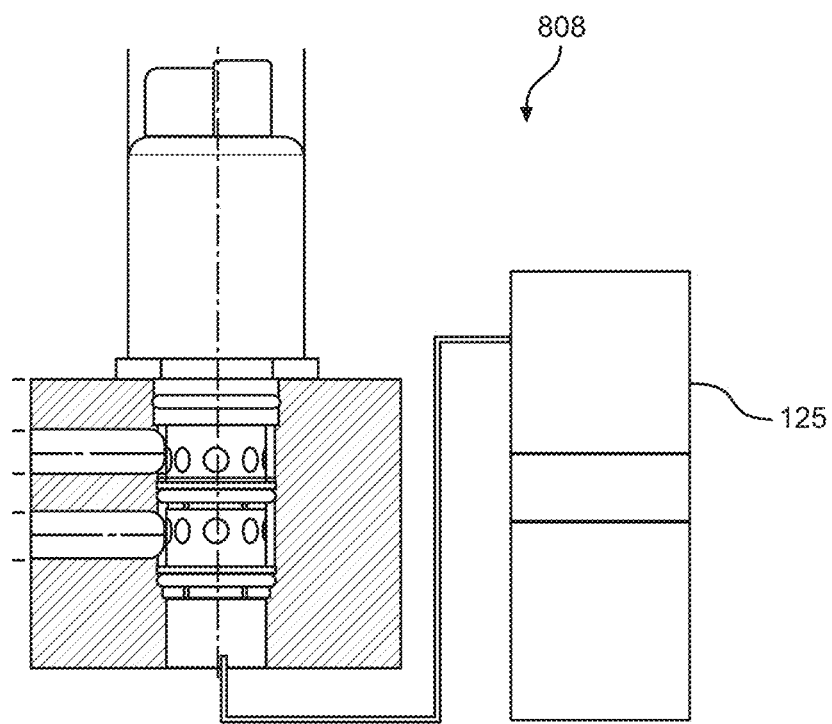
FIG. 8 is a perspective view of valve, in accordance with an embodiment.
Figure 8:
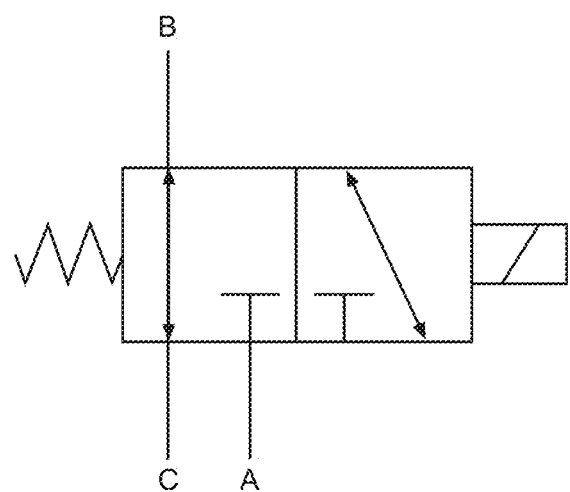

FIG. 8 is a perspective view of valve 808, in accordance with an embodiment. In one embodiment, valve 808 is a FEMA 3 port valve. This would allow for quicker, more expansive control of pumping the preload cylinder, and not being limited by a soft bleed setting.

Figure 9:
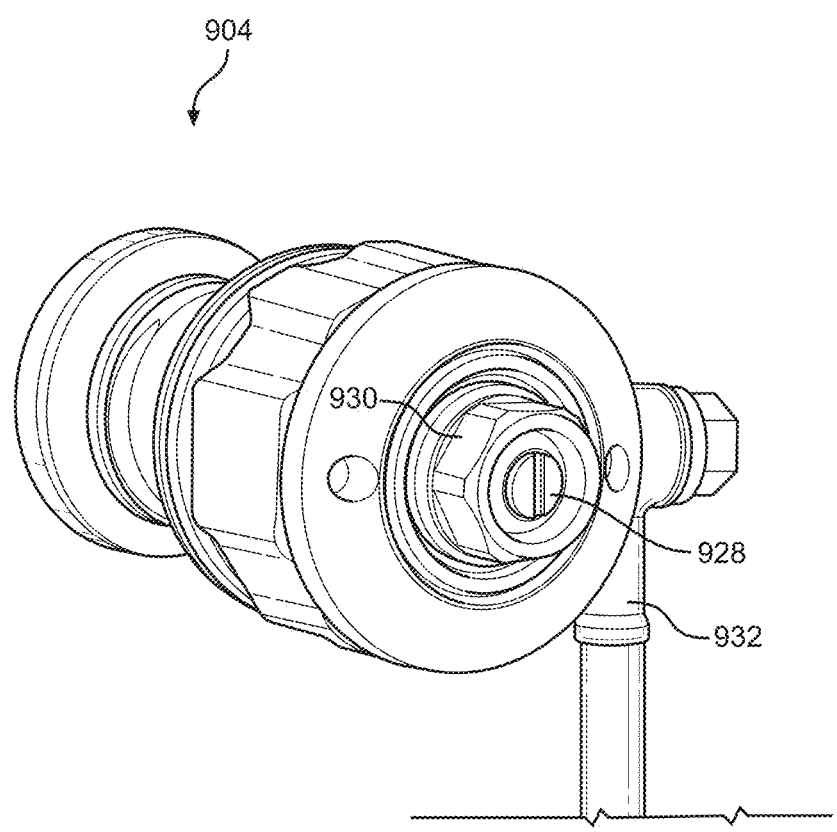
FIG. 9 is a perspective view of base valve, according to an embodiment.

FIG. 9 is a perspective view of base valve 904, according to an embodiment. Also included in FIG. 9 is spring preload adjuster 928, compression adjuster 930, and tube 932.

It should be noted that some embodiments include base valves with designs such as those shown in at least FIG. 3, however the design shown in at least FIG. 9 can also be used with previously discussed embodiments.

One benefit of the design shown in at least FIG. 9 is the extra adjustability of the system that is available to an end user. Base valve 904 is also designed to be modular, such that a preload system could be installed on a suspension system that did not previously include a preload adjustment system. While the base valve shown in at least FIG. 9 is described to be manually adjustable, it should be understood that the system can also be electronically adjustable by utilizing, say, a DC motor, stepper motor, valving, etc.

Figure 10:
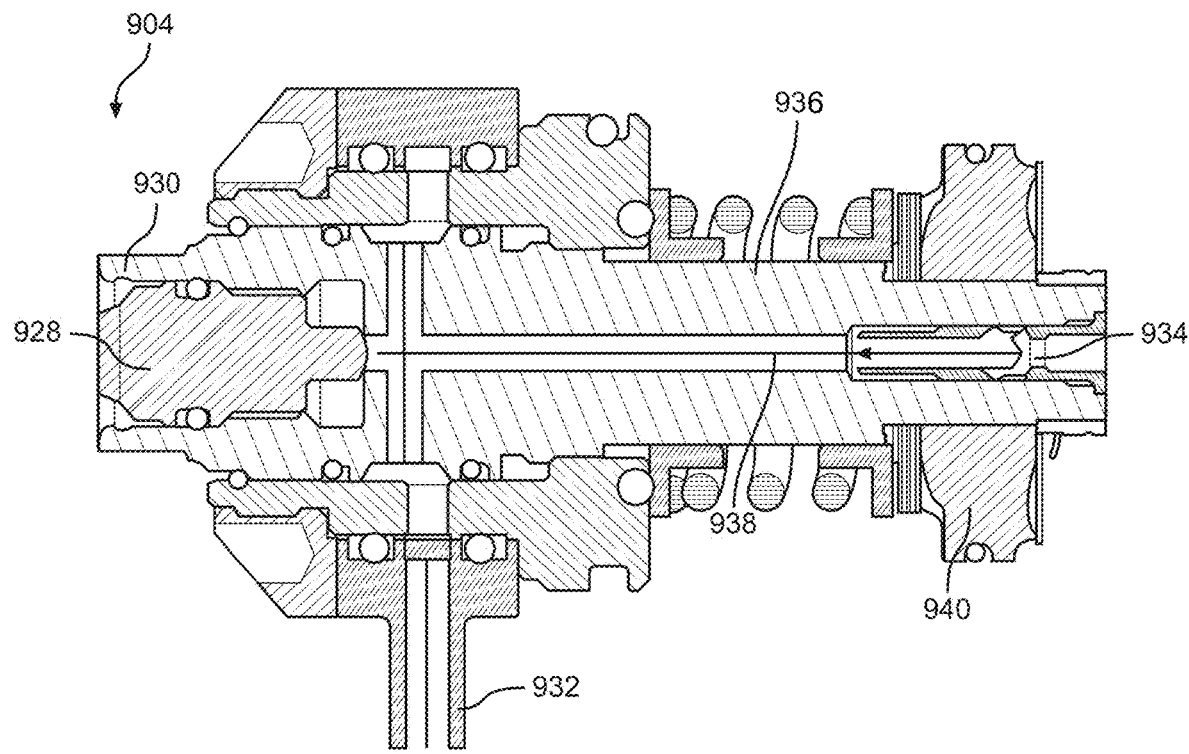
FIG. 10 is a first cross section view of base valve, according to an embodiment.

FIG. 10 is a first cross section view of base valve 904, according to an embodiment. Also included are check valve 934, fluid flow arrow 98, chamber 936, and piston 940.

In one embodiment, fluid enters base valve 904 from the compression chamber 212 through check valve 934. When the spring preload adjuster 928 is in a closed position (as shown) fluid will follow fluid flow arrow 938 though the valve, and out tube 932. Tube 932 leads to the preload cylinder 206. Fluid can also flow through piston 940 and into chamber 936, which is fluidly connected to external reservoir 125.

Similar to previously discussed embodiments, while the spring preload adjuster 928 is in a closed position fluid can flow into preload cylinder 206 but is unable to exit until the spring preload adjuster 928 is opened and pressure is released.

In one embodiment, compression adjuster 930 is used to change the position of piston 940. By moving piston 940 to the left (relatively), the preload of the shims on piston 940 is increased. By moving piston 940 to the right, the preload on the shims is lessened. Ports that go through piston 940 can be seen in at least FIG. 11. The compression adjuster 930 allows an end user to adjust the settings.

Figure 11:
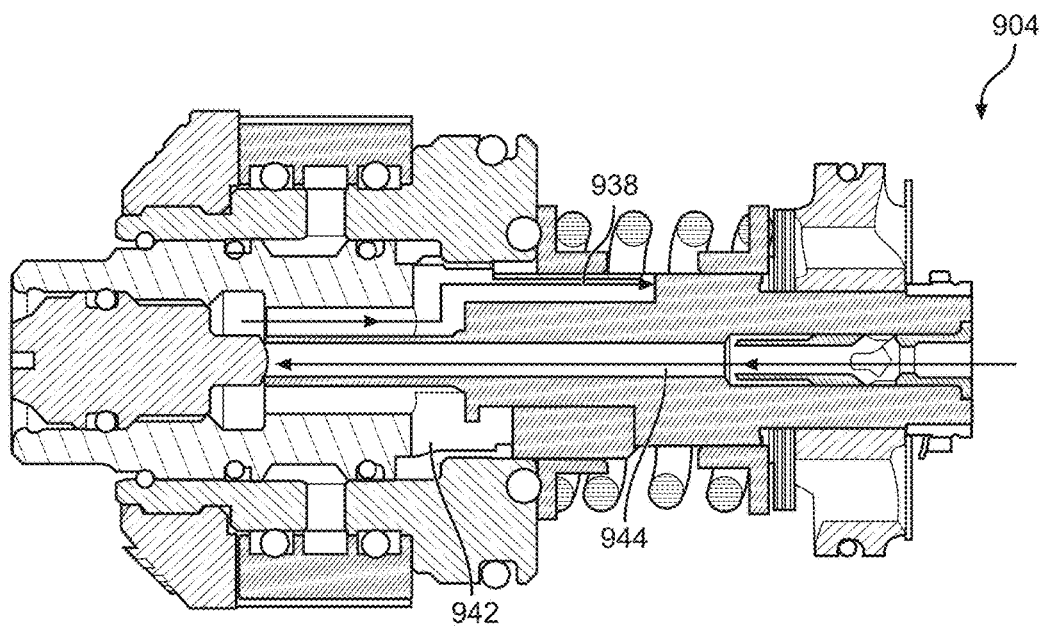
FIG. 11 is a second cross section view of base valve, according to an embodiment.

FIG. 11 is a second cross section view of base valve 204, according to an embodiment. Also included are fluid flow arrows 938 and flow path 942.

In one embodiment, when the spring preload adjuster 928 is moved to an open position fluid is then able to flow through flow path 942, which connects to chamber 936. It should be understood that while spring preload adjuster 928 is shown in a closed position, an open position would have spring preload adjuster 928 moved slightly to the left of what is shown such that chamber 936 is in fluid communication with second chamber 944.

Figure 12:
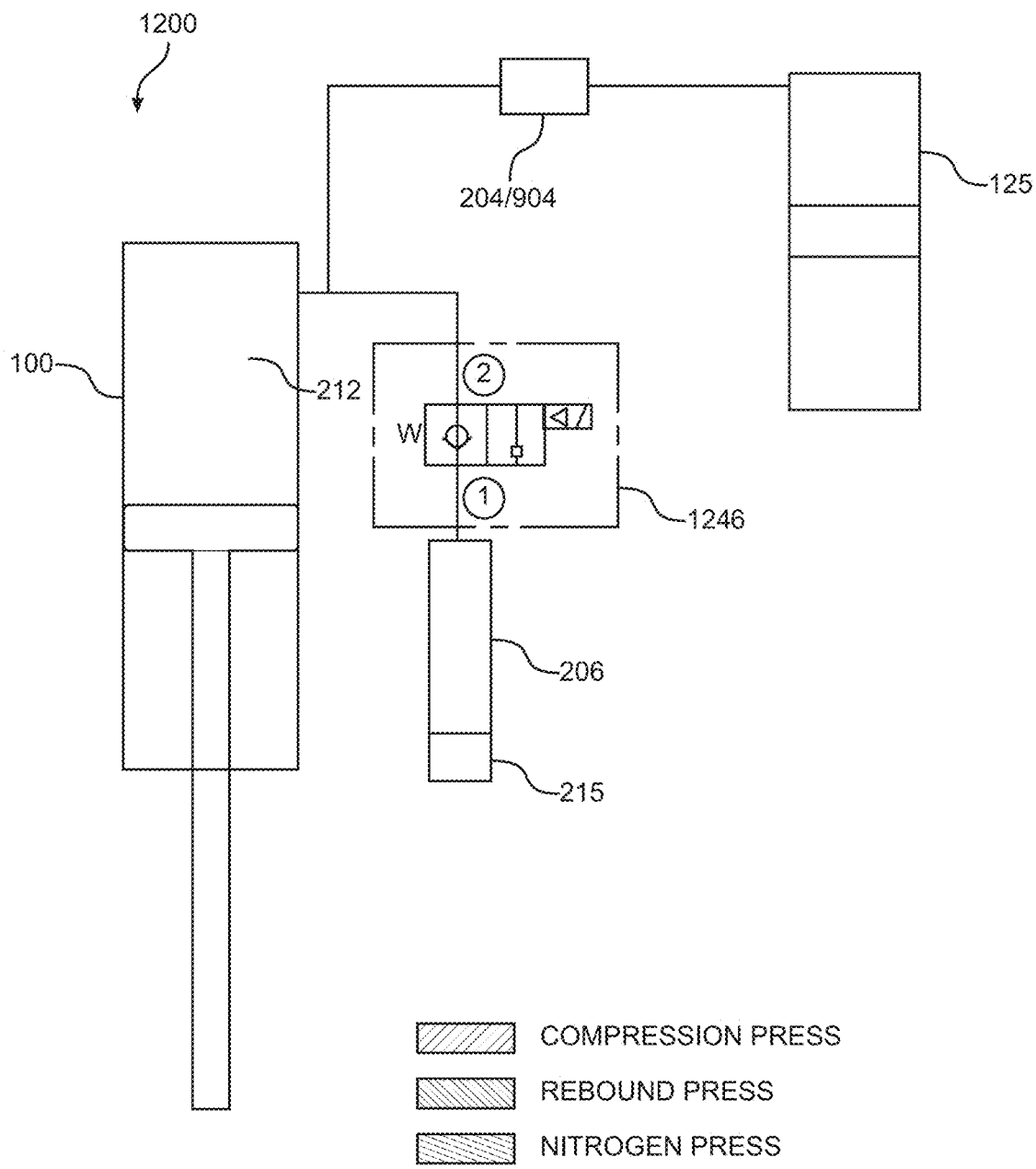
FIG. 12 is a hydraulic overview of spring preload system, in accordance with an embodiment.

FIG. 12 is a hydraulic overview of spring preload system 1200, in accordance with an embodiment. Also included is two-way electronic valve 1246.

In one embodiment, a two-way electronic valve 1246 is used to meter fluid flow in and out of preload cylinder 206. It should be understood that any of the previously discussed base valve embodiments are compatible with the embodiment shown in at least FIG. 12. In one embodiment, the two-way electronic valve 1246 is tied into the fluid flow path connecting to the external reservoir 125. In one embodiment, the two-way electronic valve 1246 is tied into the fluid flow path of the compression chamber. In one embodiment, a three-port valve (such as valve 808) is used instead. In embodiments with a three-port valve, the compression damping settings can be altered while in a steady state setting.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments can be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A spring preload system comprising:
   a cylinder, said cylinder comprising an outer diameter;
   a body to house at least said cylinder;
   a piston shaft;
   a main damping piston, said main damping piston coupled to said piston shaft and configured for operation within said cylinder, said main damping piston configured to divide said cylinder into a compression side and a rebound side;
a reservoir fluidly coupled with said cylinder via a pair of parallel fluid flow pathways, said parallel fluid flow pathways comprising:
　a first fluid flow pathway comprising a base valve fluidly disposed between said cylinder and said reservoir; and
　a second fluid flow pathway comprising:
　　a preload cylinder to provide for a change in a suspension preload, wherein said suspension preload is changed by a pressure change of a fluid in said preload cylinder;
　　an orifice fluidly disposed between said compression side and said preload cylinder; and
　　a valve fluidly disposed between said preload cylinder and said reservoir, wherein a flow passage of said valve is larger than a flow passage of said orifice, and wherein said valve is configured to control a pressure of said fluid in said preload cylinder.

2. The spring preload system of claim 1 wherein said reservoir is a remote reservoir; and
said base valve meters fluid flow between said compression side and said remote reservoir.

3. The preload cylinder of claim 1 further comprising:
a preload flange, wherein said preload flange is disposed around said outer diameter, wherein said preload flange moves along said cylinder;
a cavity, said cavity formed by said cylinder, said preload flange, and said body; and
a spring, wherein said spring is braced against said preload flange.

4. The spring preload system of claim 1 wherein, a compression stroke is used to pump fluid into said preload cylinder in order to increase the preload.

5. The spring preload system of claim 1 wherein, when said valve is in an open position there is a decrease in the preload and the compression damping.

6. The spring preload system of claim 1 wherein, when said valve is in a closed position there is an increase in the preload and the compression damping.

7. The spring preload system of claim 1 wherein, changes in the preload will also change the damping.

8. A spring preload system comprising:
a cylinder, said cylinder comprising an outer diameter;
a body to house at least said cylinder;
a piston shaft;
a main damping piston, said main damping piston coupled to said piston shaft and configured for operation within said cylinder, said main damping piston configured to divide said cylinder into a compression side and a rebound side;
a reservoir fluidly coupled with said cylinder via a pair of parallel fluid flow pathways, said parallel fluid flow pathways comprising:
　a first fluid flow pathway comprising a base valve fluidly disposed between said cylinder and said reservoir; and
　a second fluid flow pathway comprising:
　　a preload cylinder to provide for a change in a suspension preload, wherein said suspension preload is changed by a pressure change of a fluid in said preload cylinder;
　　an orifice fluidly disposed between said compression side and said preload cylinder; and
　　a valve fluidly disposed between said preload cylinder and said reservoir, wherein a flow passage of said valve is larger than a flow passage of said orifice, and wherein said valve is configured to control a pressure of said fluid in said preload cylinder; and
wherein said preload cylinder comprises;
　a preload flange, wherein said preload flange is disposed around said outer diameter, wherein said preload flange moves along said cylinder;
　a cavity, said cavity formed by said cylinder, said preload flange, and said body; and
　a spring, wherein said spring is braced against said preload flange.

9. The spring preload system of claim 8 wherein said reservoir is a remote reservoir; and
said base valve meters fluid flow between said compression side and said remote reservoir.

10. The spring preload system of claim 8 wherein, a compression stroke is used to pump fluid into said preload cylinder in order to increase the preload.

11. The spring preload system of claim 8 wherein, when said valve is in an open position there is a decrease in the preload and the compression damping.

12. The spring preload system of claim 8 wherein, when said valve is in a closed position there is an increase in the preload and the compression damping.

13. The spring preload system of claim 8 wherein, changes in the preload will also change the damping.

14. A suspension system comprising:
a cylinder, said cylinder comprising an outer diameter;
a body to house at least said cylinder;
a piston shaft;
a main damping piston, said main damping piston coupled to said piston shaft and configured for operation within said cylinder, said main damping piston configured to divide said cylinder into a compression side and a rebound side;
a reservoir fluidly coupled with said cylinder via a pair of parallel fluid flow pathways, said parallel fluid flow pathways comprising:
　a first fluid flow pathway comprising a base valve fluidly disposed between said cylinder and said reservoir; and
a second fluid flow pathway comprising a spring preload system, said spring preload system comprising:
　a preload cylinder to provide for a change in a suspension preload, wherein said suspension preload is changed by a pressure change of a fluid in said preload cylinder;
　an orifice fluidly disposed between said compression side and said preload cylinder; and
　a valve fluidly disposed between said preload cylinder and said reservoir, wherein a flow passage of said valve is larger than a flow passage of said orifice, and wherein said valve is configured to control a pressure of said fluid in said preload cylinder.

15. The suspension system of claim 14 wherein said reservoir is a remote reservoir; and
said base valve meters fluid flow between said compression side and said remote reservoir.

16. The preload cylinder of claim 14 further comprising:
a preload flange, wherein said preload flange is disposed around said outer diameter, wherein said preload flange moves along said cylinder;
a cavity, said cavity formed by said cylinder, said preload flange, and said body; and a spring, wherein said spring is braced against said preload flange.

17. The suspension system of claim 14 wherein, a compression stroke is used to pump fluid into said preload cylinder in order to increase the preload.

18. The suspension system of claim 14 wherein, when said valve is in an open position there is a decrease in the preload and the compression damping.

19. The suspension system of claim 14 wherein, when said valve is in a closed position there is an increase in the preload and the compression damping.

20. The suspension system of claim 14 wherein, changes in the preload will also change the damping.

* * * * *